(12) United States Patent
Kesavan et al.

(10) Patent No.: US 11,137,324 B1
(45) Date of Patent: Oct. 5, 2021

(54) MODIFIED COLLECTION PLATES FOR A CASCADE IMPACTOR

(71) Applicant: Combat Capabilities Development Command, Chemical Biological Center, APG, MD (US)

(72) Inventors: Jana S Kesavan, Catonsville, MD (US); Jerold R. Bottiger, Aberdeen, MD (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 15 days.

(21) Appl. No.: 16/844,075

(22) Filed: Apr. 9, 2020

(51) Int. Cl.
*G01N 1/22* (2006.01)
*G01N 15/02* (2006.01)
(52) U.S. Cl.
CPC ......... *G01N 1/2208* (2013.01); *G01N 1/2205* (2013.01); *G01N 15/0255* (2013.01); *G01N 2001/2223* (2013.01); *G01N 2015/0261* (2013.01)
(58) Field of Classification Search
CPC ............. G01N 1/2208; G01N 15/0255; G01N 1/2205; G01N 2001/2223; G01N 2015/0261
See application file for complete search history.

(56) References Cited

U.S. PATENT DOCUMENTS

| | | | | |
|---|---|---|---|---|
| 2005/0247868 | A1* | 11/2005 | Call | G01N 15/0255 250/282 |
| 2007/0122349 | A1* | 5/2007 | Wachtel | G01N 15/0255 424/45 |
| 2009/0018668 | A1* | 1/2009 | Galbraith | B01D 53/0446 623/23.65 |
| 2012/0045752 | A1* | 2/2012 | Ensor | B82Y 15/00 435/5 |
| 2013/0316393 | A1* | 11/2013 | Swanson | C12Q 1/04 435/34 |
| 2019/0330675 | A1* | 10/2019 | Ensor | G01N 1/2202 |

* cited by examiner

*Primary Examiner* — David Z Huang
(74) *Attorney, Agent, or Firm* — Ulysses John Biffoni

(57) ABSTRACT

A collection plate for a cascade impactor is provided that includes: a container; an absorbent layer including a bottom surface and a top surface, the absorbent layer residing within the container, the absorbent layer further including a liquid medium within the absorbent layer; and an impaction membrane placed on the top surface of the absorbent layer, such that the impaction membrane is in fluidic communication with the absorbent layer. The absorbent layer is configured to hydrate the impaction membrane for at least four hours in a temperature of about 78° F. at 37% RH. The collection plate may be utilized as a component in a cascade impactor and/or in a method of collecting a biological sample with a cascade impactor.

19 Claims, 3 Drawing Sheets

US 11,137,324 B1

MODIFIED COLLECTION PLATES FOR A CASCADE IMPACTOR

GOVERNMENT INTEREST

The invention described herein may be manufactured, used and licensed by or for the United State Government.

FIELD OF THE INVENTION

The present disclosure generally relates to collection plates for a cascade impactor and in particular to collection plates for a cascade impactor that reduce the bounce of the particles and maintain hydration of the collected particles in order to increase the collected particles' viability.

BACKGROUND OF THE INVENTION

Contagious diseases have the potential to spread into outbreaks through a variety of mechanisms, such as transfer of infectious agents by air or surface contact. Many major human infectious diseases are transmitted by aerosolized microorganisms, including bacterial diseases, viral diseases, and fungal diseases.

Infectious organisms within the airways' mucus material are commonly released into the air during breathing, talking, singing, coughing, and/or sneezing. These aerosol particles range in size depending on the mechanism of release. For example, submicron particles are released during breathing, while micron size particles are released during sneezing and coughing. The incidence and the type of subsequent infection of a nearby individual depend on the organism as well as the particle size, which determines how long the organism stays airborne, how far it travels, and the deposition location of the organism within the respiratory system. As such, when studying airborne transfer of infectious organisms, it is important to determine the particle sizes as well as particle concentrations.

Many types of systems exist to capture biological aerosols from the air such as filters, impingers, cyclones, and cascade impactors. Filters and impingers collect particles of all sizes together, while multistage cyclones and cascade impactors collect particles separated by size on different stages. The size separation depends on the design of the sampler and the sampling air flow rate. Sampling time is also an important parameter in selecting bioaerosol samplers in order to preserve biological integrity of the organisms.

Andersen viable cascade impactors were designed to collect biological aerosols into agar-filled plates to determine the type and concentration of culturable biological aerosols. The captured aerosol particles are separated by aerodynamic size, which takes into account the geometric size, density, and shape of the particle. The Andersen viable cascade impactor consists of one or more stages (e.g., two stages, four stages, six stages, eight stages, etc.), in which each stage may contain hundreds of orifices. The orifice size is progressively reduced in each subsequent stage to further accelerate the air and collect smaller particles in lower stages of the impactor. Each stage of the Andersen cascade impactor has a size cut point range designed to represent deposition in various regions of the respiratory system. For example, particles larger than 7 micrometers in diameter may be collected in the upper ($1^{st}$) stage, 4.7-7.0 micrometers in the $2^{nd}$ stage, 3.3-4.7 micrometers in the $3^{rd}$ stage, 2.1-3.3 micrometers in the $4^{th}$ stage, 1.1-2.1 micrometers in the $5^{th}$ stage, and 0.6-1.1 micrometers in the bottom ($6^{th}$) stage. This cascade impactor is widely used to size-selectively enumerate culturable particles in the air.

Particle bounce is a problem in cascade impactors that have hard collection surfaces. Many modifications have been made to the collection surface to reduce bounce. For example, coated surfaces and agar plates have been used to reduce bounce of particles and to maintain biological organisms in a humid environment. Teflon tape, Nucleopore, and glass fiber filters have been also used as impaction surfaces to reduce bounce. In addition, polyurethane foam has been used to reduce bounce and to collect large quantities of material by impaction for toxicological, biological, and chemical characterization studies. However, these techniques employ dry collection surfaces and commonly suffer from a variety of disadvantages. For example, a longer sampling time may dry out the collected organisms on a dry collection surface, thereby inactivating the sample. Further, quantification of the collected organisms requires culturing them, which is a time consuming process. Moreover, typical collection surfaces may result in fast-growing organisms hiding slow-growing organisms, and even inhibition of organism growth.

Thus, there exists a need for collection surfaces adapted for use in cascade impactors for addressing the aforementioned limitations of collection surfaces.

SUMMARY OF THE INVENTION

This disclosure provides new collection plates suitable for use in a cascade impactor. The provided collection plates allow for efficient capture of organisms and maintain the sample on a suitable surface for extraction into a liquid for multiple types of sample analysis. As such, a collection plate according to some embodiments as provided herein includes: a container; an absorbent layer comprising a bottom surface and a top surface, the absorbent layer residing within the container, the absorbent layer further comprising a liquid medium within the absorbent layer; and an impaction membrane placed on the top surface of the absorbent layer, such that the impaction membrane is in fluidic communication with the absorbent layer. The absorbent layer is configured to hydrate the impaction membrane for at least four hours in a temperature of about 78° F. at 37% RH.

Also provided is a cascade impactor that includes an inlet and an outlet, a vertical series of collector stages between the inlet and the outlet, and a filter in fluidic communication with the outlet. Each collector stage, or independently selected collector stages optionally include a collection plate as provided herein. The collection plate optionally includes: a container; an absorbent layer comprising a bottom surface and a top surface, the absorbent layer residing within the container, the absorbent layer further comprising a liquid medium within the absorbent layer; and an impaction membrane placed on the top surface of the absorbent layer, such that the impaction membrane is in fluidic communication with the absorbent layer. The absorbent layer is configured to hydrate the impaction membrane for at least four hours in a temperature of about 78° F. at 37% RH.

Also provided are methods of collecting one or more biological samples with a cascade impactor includes: introducing a biological sample, optionally in aerosolized form, to the cascade impactor, the cascade impactor comprising an inlet, an outlet, and a vertical series of collector stages between the inlet and the outlet; and collecting the biological sample from any of the collector stages. The cascade impactor further includes: a filter in fluidic communication with the outlet; a container; an absorbent layer comprising a bottom surface and a top surface, the absorbent layer residing within the container, the absorbent layer further comprising a liquid medium within the absorbent layer; and an impaction membrane placed on the top surface of the absorbent layer, such that the impaction membrane is in fluidic communication with the absorbent layer. The absorbent layer is configured to hydrate the impaction membrane for at least four hours in a temperature of about 78° F. at 37% RH.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the subject technology as claimed.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION OF THE INVENTION

The devices as provided herein have utility as a collection plate for a cascade impactor, as a cascade impactor that includes one or more collection plates, and/or as a method of collecting a biological sample with a cascade impactor that includes one or more collection plates.

Figure 1:
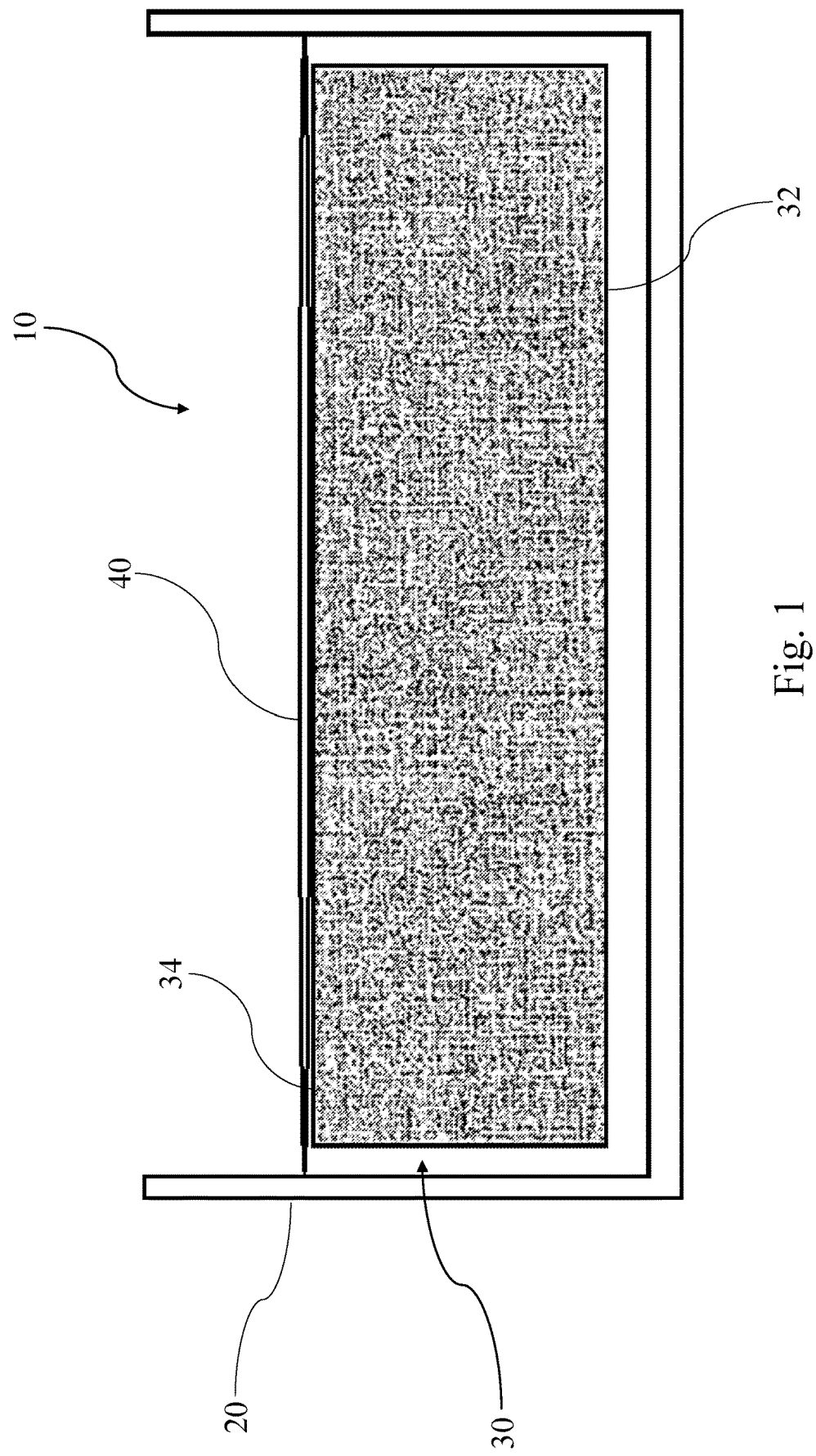
FIG. 1 is a cross-sectional view of a collection plate for a cascade impactor, in accordance with one or more of the embodiments disclosed herein.

Referring initially to FIG. 1 illustrating an exemplary collection plate according to some aspects as provided herein, the collection plate 10 for a cascade impactor includes: a container 20; an absorbent layer 30 including a bottom surface 32 and a top surface 34, the absorbent layer 30 residing within the container 20, the absorbent layer 30 further including a liquid medium within the absorbent layer 30; and an impaction membrane 40 placed on the top surface 34 of the absorbent layer 30, such that the impaction membrane 40 is in fluidic communication with the absorbent layer 30. The absorbent layer 30 is configured to hydrate the impaction membrane 40 for at least four hours in a temperature of about 78° F. at 37% RH. Without being limited to any particular theory, it is believed that the design of the collection plate as provided herein allows the impaction membrane 40 to both reduce the bounce of a particle that impacts the impaction membrane 40 and also work in concert with the absorbent layer 30 to allow the absorbent layer 30 to stay hydrated during use.

The container 20 may be or include any suitable vessel used in a cascade impactor. Illustratively a container is a petri dish. A container may be formed of any desired material such as glass, metal, plastic (e.g. polycarbonate, etc.), or other suitable material.

The absorbent layer 30, which resides in the container 20 of the collection plate 10, is configured so as to hydrate an impaction membrane residing on a top surface 34 of the absorbent layer for at least four hours in a temperature of about 78° F. at 37% RH. In embodiments, the absorbent layer 30 is placed into the container 20 along with the liquid medium. Enough liquid medium is placed into the container 20 such that the liquid medium at least partially covers the absorbent layer 30. An impaction membrane 40 is then placed on the top surface 34 of the absorbent layer 30, such that the impaction membrane 40 is in fluidic communication with the absorbent layer 30. In some embodiments, enough liquid medium is introduced to the container such that the liquid medium is in direct contact with the impaction membrane 40 in order to maintain the impaction membrane 40 in a hydrated state. In other embodiments, the liquid medium is introduced to the impaction membrane 40 via the top surface 34 of the absorbent layer 30 alone.

The absorbent layer 30 is optionally dimensioned to reside within container 20 of the collection plate and optionally fill the area equal to the cross sectional area of the container 20. An absorbent layer is characterized by a height defined as the distance from the bottom surface 32 to the top surface 34. The height of the absorbent layer 30 is optionally identical to the height of agar in an agar plate traditionally used in a cascade impactor. Optionally, the height is adjusted so as to position the impaction membrane at a desired height so as to allow control of the particle size that the impaction membrane is exposed to within the cascade impactor. Optionally, the material used to form the absorbent layer is resistive of changes in height if the fluid in the absorbent layer is reduced such as by evaporation during use.

The absorbent layer 30 may be made from any suitable absorbent material capable of hydrating the impaction membrane 40 for at least four hours in a temperature of about 78° F. at 37% RH. The absorbent layer 30 may include a natural sponge, an artificial sponge, glass, metal, ceramic, plastic, or any combination thereof. In some embodiments, the glass, metal, ceramic, and/or plastic use in an absorbent layer is sintered in order to enhance physical properties of the absorbent layer 30, such as strength, electrical conductivity, translucency, or thermal conductivity.

The liquid medium that is incorporated into an absorbent layer, added on top of an absorbent layer or combinations thereof, may include or consist of any liquid suitable for collecting organisms or biological samples in a cascade impactor. In some embodiments, the liquid medium includes water, one or more polysorbates (e.g., Tween 20, Tween 40, Tween 60, Tween 80, etc.), phosphate buffered saline optionally Butterfield's phosphate buffer, a buffering agent, a buffering mixture, a buffering compound, nutrient broth, lysogeny broth, tryptic soy brother, skim milk, peptone water, glycerol, mineral oil, or combinations thereof. In some embodiments, the liquid medium is substantially free of agar. Regardless of which liquid medium is chosen, the liquid medium works in concert with the absorbent layer to hydrate the impaction membrane 40 for at least four hours in a temperature of about 78° F. at 37% RH.

The impaction membrane 40 reduces the bounce of particles traveling through a cascade impactor. The absorbent layer maintains hydration of the impaction membrane, and therefore hydration of particles deposited onto the absorbent membrane. In embodiments, the impaction membrane 40 is formed of a material in the form of a filter. Optionally, an impaction membrane is formed of mixed cellulose esters, cellulose acetate, coated cellulose acetate, polytetrafluoroethylene, nylon, polycarbonate, collodion, glass fiber, or combinations thereof, all of which are suitable for reducing the bounce of particles traveling through a cascade impactor and have the appropriate ability to be wetted by the absorbent layer, and therefore maintain hydration of particles deposited onto the impaction membrane.

The impaction membrane 40 may have any suitable thickness, as long as the total distance from an inlet of the cascade impactor to the impaction membrane surface is maintained at the manufacturer's recommended distance. In other words, the thicker the impaction membrane 40, the thinner the absorbent layer 30 to ensure that the recommended distance is maintained. In embodiments, the impaction membrane has a thickness from 5 µm to 500 µm, or any subrange therebetween. In some embodiments, the impaction membrane filter 40 has a thickness from 10 µm to 400 µm, from 15 µm to 300 µm, from 20 µm to 200 µm, from 25 µm to 100 µm, from 30 µm to 70 µm, from 40 µm to 60 µm, or about 50 µm.

The impaction membrane 40 may be characterized by its ability to prevent a particle of desired size from passing through the impaction membrane so that it may be properly collected on the impaction membrane surface for subsequent analyses. The pore size of the impaction membrane may correlate to be smaller than, for example, the diameter of a bacterial particle or a clustered viral particle. In embodiments, the impaction membrane 40 has a pore size from 0.01 µm to 2 µm, or any subrange therebetween. In some embodiments, the impaction membrane 40 has a pore size from 0.025 µm to 1.5 µm, from 0.05 µm to 1.0 µm, from 0.075 µm to 0.75 µm, from 0.1 µm to 0.5 µm, from 0.15 µm to 0.25 µm, or about 0.2 µm. Regardless of the material, thickness, and/or pore size of the impaction membrane 40, in embodiments the impaction membrane filter is configured to be wetted by the liquid medium.

The ability to maintain a wet impaction membrane surface by the interaction with the absorbent layer 30 allows for much greater flexibility in characterizing the particles or organisms therein that are collected on the surface of the impaction membrane during operation. The particles collected on the impaction membrane surface are then transferred into liquid for further analysis by various methods. Illustratively, the organisms or particles may be subsequently analyzed by methods such as polymerase chain reaction (PCR), pulsed filed gel electrophoresis, blotting such as Southern blotting, western blotting or northern blotting, ribotyping, immunoassay, plating and organism growth or expansion, optionally selectively, flow cytometry, functional assay, or any other assay for the detection of an organism such as bacteria, virus, or other.

Figure 2:
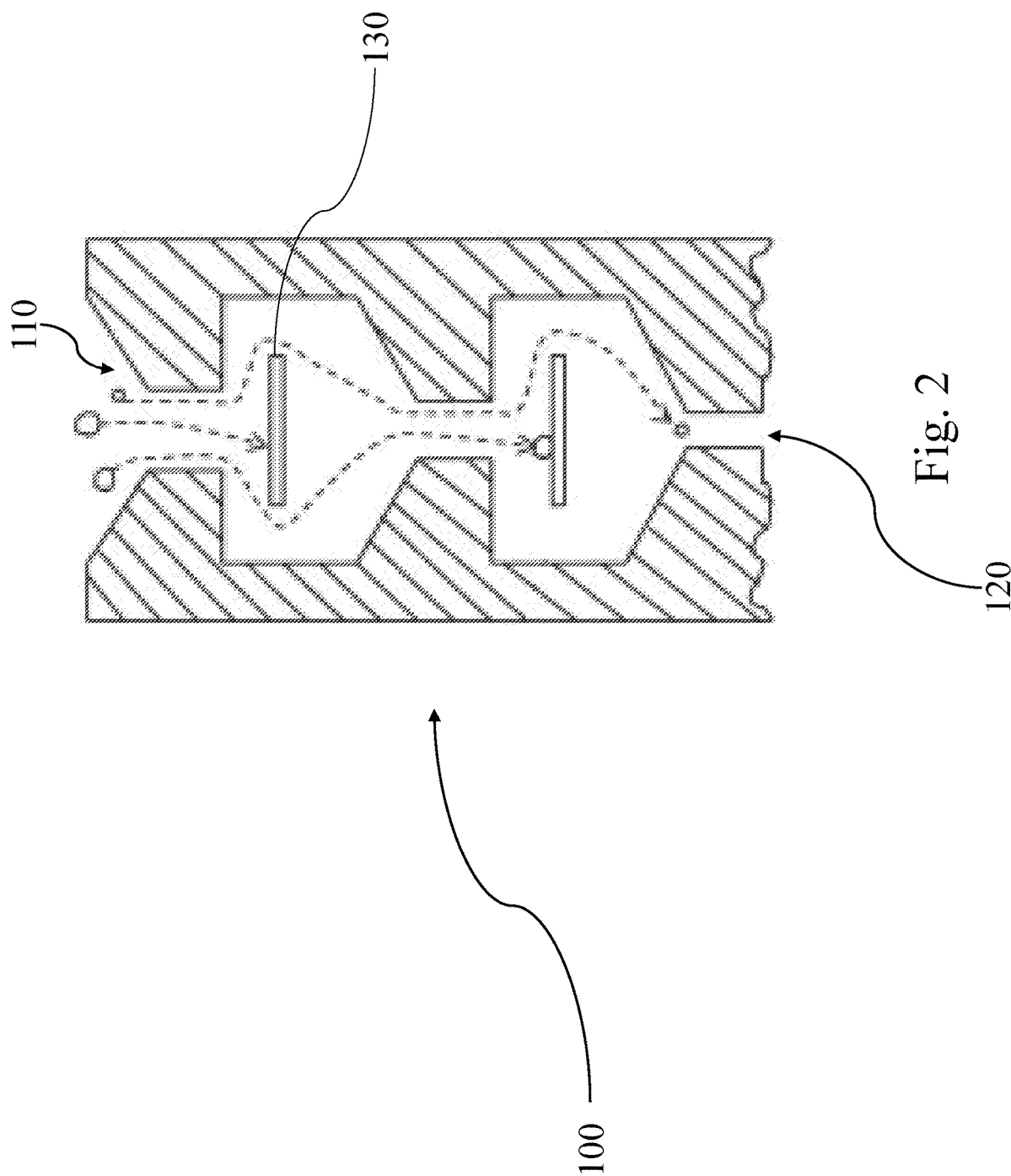
FIG. 2 is a cross-sectional view of a cascade impactor, in accordance with one or more of the embodiments disclosed herein.

Also provided is a cascade impactor that employs one or more collection plates as provided herein. Referring now to FIG. 2 illustrating a generalized schematic of a cascade impactor, in embodiments, a cascade impactor 100 includes an inlet 110 and an outlet 120; a vertical series of collector stages 130, between the inlet 110 and the outlet 120; and a filter (shown in FIG. 3) optionally in fluidic communication with the outlet 120. Here, each collector stage 130 includes a collection plate, optionally as the collection plate 10 as shown and described in FIG. 1. While FIG. 2 shows two collector stages 130, it will be understood by one skilled in the art that the cascade impactor 100 may include as many collector stages 130 as desired, optionally 2, 3, 4, 5, 6, 7, 8, 9, 10, or more. As can be seen in FIG. 2, the largest particle is collected in the collector stage 130 closest to the inlet 110, the intermediate particle is collected in the collector stage 130 closest to the outlet 120, and the smallest particle bypasses both collector stages 130 and is pulled from the outlet 120. As such, the cascade impactor 100 is suitable for collecting differently-sized particles at each collector stage 130 that may be further used for testing such that the particles may be analyzed and studied.

In some embodiments, the cascade impactor 100 may include six collector stages 130. In such embodiments, the collector stage 130 closest to the inlet 110 (i.e., the first collector stage 130) is configured to collect particles greater than or equal to 7 µm in diameter. Each successive collector stage 130 (i.e., the collector stages 130 traveling vertically from the inlet 110 to the outlet 120) collect smaller and smaller particle sizes as the particles pass from the inlet 110 to the outlet 120. For example, the second collector stage 130 positioned directly below the first collector stage 130 may be configured to collect particles from 4.7 µm to 7 µm in diameter. The third collector stage 130 may be configured to collect particles from 3.3 µm to 4.7 µm in diameter. The fourth collector stage 130 may be configured to collect particles from 2.1 µm to 3.3 µm in diameter. The fifth collector stage 130 may be configured to collect particles from 1.1 µm to 2.1 µm in diameter. Finally, the sixth collector stage 130 may be configured to collect particles from 0.6 µm to 1.1 µm in diameter. It should be appreciated that a cascade impactor 100 having more collector stages 130 may have smaller ranges and subranges for particle collection.

Figure 3:
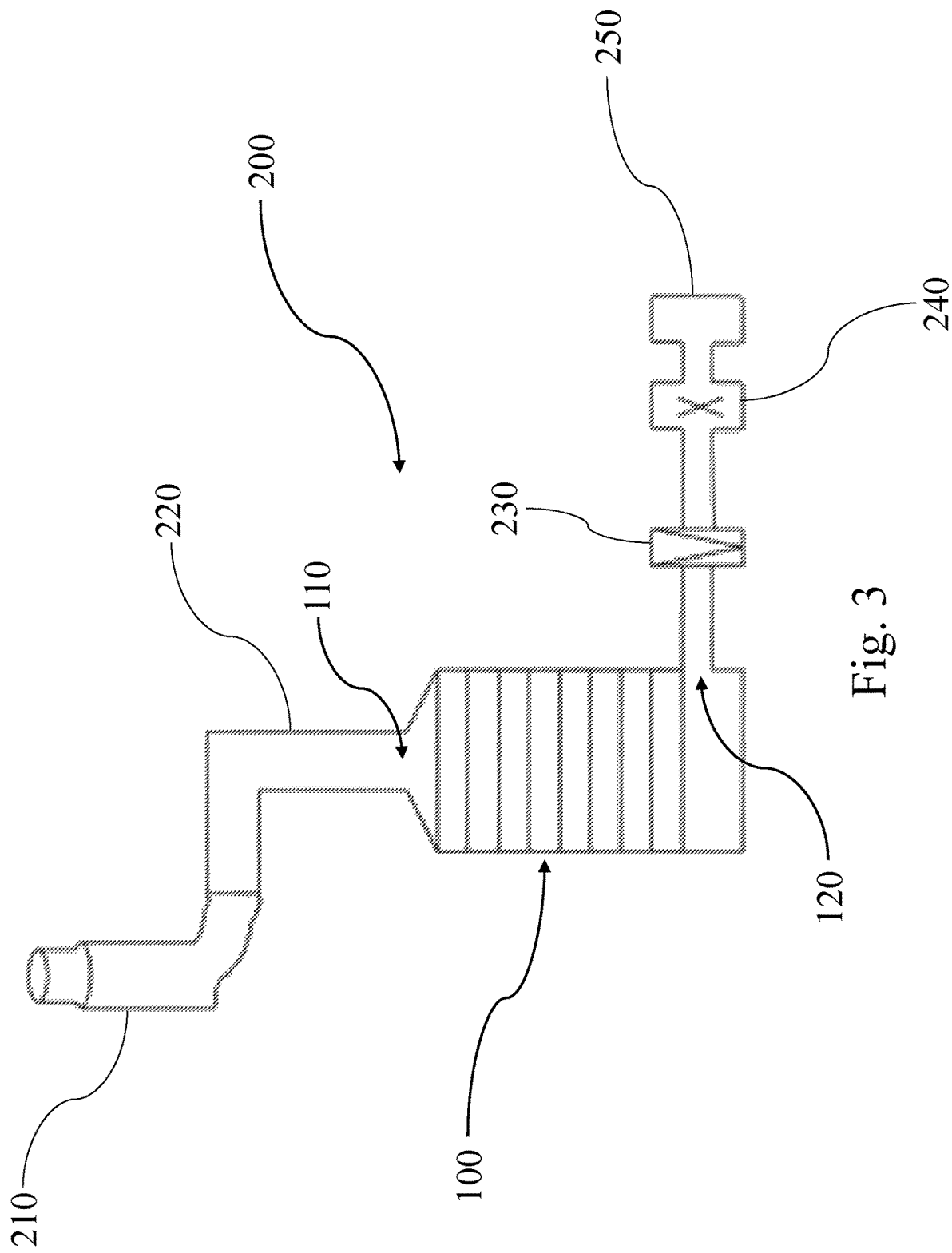
FIG. 3 is a schematic view of a cascade impactor attached to various other components, in accordance with one or more of the embodiments disclosed herein.

Referring now to FIG. 3, the cascade impactor 100 may be incorporated as a component in a cascade impaction setup 200. As shown in FIG. 3, the cascade impaction setup 200 includes a particle injection nozzle 210 that is fluidly coupled with an induction port 220, to which the inlet 110 of the cascade impactor 100 is attached. The outlet 120 of the cascade impactor 100 is coupled to a flow control valve 230, a filter 240, and a vacuum pump 250 that pulls particles from the particle injection nozzle 210 through the cascade impactor 100 and to the outlet 120.

As shown in FIG. 3, the cascade impactor 100 of the cascade impaction setup 200 has eight collector stages. It should be appreciated that the number of collector stages cascade impaction setup 200 is not limited and may vary based on the desired functionality of the cascade impaction setup 200 and/or the cascade impactor 100.

In some embodiments, a sample, such as an aerosolized biological sample, is introduced to the cascade impaction setup 200 by the particle injection nozzle 210. The particle injection nozzle 210 then passes the sample to the induction port 220, to which the particle injection nozzle 210 is fluidly coupled. The sample is then passed from the induction port 220 to the cascade impactor 100 via the inlet 110. The cascade impactor 100 may include any number of collector stages, each having a collection plate, such as the collection plate 10 having any of the embodiments described herein and as shown in FIG. 1. Once the sample has become embedded with the collection plate(s), any uncollected particles in the sample are passed from the outlet 120 through the flow control valve 230 and to the filter 240. The vacuum 250 functions to provide the force that pulls the air sample through the cascade impaction setup 200. In embodiments, the vacuum 250 provides an air flow rate within the cascade impaction setup 200 optionally of 28.3 L/min.

Any or all of the elements described herein may be included in methods of collecting a biological sample with a cascade impactor. In embodiments, a method of collecting a biological sample with a cascade impactor includes introducing a biological sample, optionally an aerosolized biological sample, to the cascade impactor, the cascade impactor comprising an inlet, an outlet, and a vertical series of collector stages between the inlet and the outlet; and collecting the biological sample from any of the collector stages. In such embodiments, the cascade impactor further includes: a filter in fluidic communication with the outlet; a container; an absorbent layer comprising a bottom surface and a top surface, the absorbent layer residing within the container, the absorbent layer further comprising a liquid medium within the absorbent layer; and an impaction membrane placed on the top surface of the absorbent layer, such that the impaction membrane is in fluidic communication with the absorbent layer. The absorbent layer is configured to hydrate the impaction membrane for at least four hours in a temperature of about 78° F. at 37% RH.

A collection plate, such as any of those collection plates described herein, is well suited for a variety of uses, illustratively including a cascade impactor or a cascade impaction setup. Without being bound by theory, it is believed that the collection plates described herein reduce bounce of particulates introduced to a cascade impactor and further keep the particulates hydrated, thereby maintaining the sample's viability, once the sample has been collected by the collection plate.

EXAMPLES

A sponge (i.e., the absorbant layer) was placed in a petri dish (i.e., the container) and filled with 20 mL of water (i.e., the liquid medium). A piece of filter paper (90 mm diameter membrane filter (0.2 micrometer pore size, GVS life Sciences, Sanford, Me., USA)) as cut to fit the petri dish and was placed on the top surface of the wet sponge, thereby forming a collection plate according to one or more embodiments herein. At the end of this assembly, the top surface of the filter paper was at the same height in the petri dish as the agar in a typical agar-filed petri dish. Maintaining the distance between the inlet and the filter paper ensured correct operation of the cascade impactor and comparison between this collection plate and a typical agar-filled petri dish.

The collection plates were then added to each stage of a six stage cascade impactor (Thermo Fisher Scientific, Waltham, Mass.). Samples were pipetted onto the surfaces of the membrane stages and the cascade impactor was operated for 4 hours at 78° F. at 37% RH with a flow rate of 28.3 L/min using clean air to test time of membrane wetting. Once operation of the cascade impactor was completed, the filter paper was placed in a centrifuge tube including 20 mL of analysis liquid and vortexed to remove the collected organsims from the filter paper. The collection plate as provided herein maintained hydraftion of the filter paper, indicating reduced particle bounce, and living organisms were successfully collected and analyzed. The collection plate was successfully used to collect organisms that survived for testing and/or culturing, even when exposed to long sample times.

These examples are not intended to limit the scope of the present invention as described herein. These examples are for purposes of illustration and it will be evident to those persons skilled in the art that numerous variations and details of the instant invention may be made without departing from the instant invention as set forth herein.

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

To the extent that the term "include," "have," or the like is used in the description or the claims, such term is intended to be inclusive in a manner similar to the term "comprise" as "comprise" is interpreted when employed as a transitional word in a claim.

It is to be understood that, while the subject technology has been described in conjunction with the detailed description, thereof, the foregoing description is intended to illustrate and not limit the scope of the subject technology. Other aspects, advantages, and modifications of the subject technology are within the scope of the claims set forth below. The specification is most thoroughly understood in light of the teachings of the references cited within the specification. The embodiments within the specification provide an illustration of embodiments of the invention and should not be construed to limit the scope of the invention.

The skilled artisan readily recognizes that many other embodiments are encompassed by the invention. All publications and patents cited in this disclosure are incorporated by reference in their entirety. To the extent the material incorporated by reference contradicts or is inconsistent with this specification, the specification will supersede any such material. The citation of any references herein is not an admission that such references are prior art to the present invention.

Those skilled in the art will recognize, or be able to ascertain using no more than routine experimentation, many equivalents to the specific embodiments of the invention described herein. Such equivalents are intended to be encompassed by the following claims.

The invention claimed is:

1. A collection plate for a cascade impactor, the collection plate comprising:
   a container, an absorbent layer comprising a bottom surface and a top surface, the absorbent layer residing within the container, the absorbent layer further including a liquid medium within the absorbent layer, and an impaction membrane placed on the top surface of the absorbent layer, such that the impaction membrane is in fluidic communication with the absorbent layer, wherein the impaction membrane absorbs the liquid medium.

2. The collection plate of claim 1, wherein the liquid medium comprises water, phosphate buffered saline, nutrient broth, lysogeny broth, skim milk, peptone water, one or more polysorbates, tryptic soy broth, glycerol, mineral oil, or combinations thereof.

3. The collection plate of claim 1, wherein the liquid medium is substantially free of agar.

4. The collection plate of claim 1, wherein the absorbent layer comprises sponge, glass, metal, ceramic, plastic, or combinations thereof.

5. The collection plate of claim 1, wherein the impaction membrane comprises a filter, mixed cellulose esters, cellulose acetate, coated cellulose acetate, polytetrafluoroethylene, nylon, polycarbonate, collodion, or combinations thereof.

6. The collection plate of claim 1, wherein the impaction membrane has a thickness from 5 µm to 500 µm.

7. A cascade impactor comprising:
an inlet and an outlet;
a vertical series of collector stages between the inlet and the outlet, and
a filter in fluidic communication with the outlet, wherein each collector stage comprises a collection plate, the collection plate comprising
a container,
an absorbent layer comprising a bottom surface and a top surface, the absorbent layer residing within the container, the absorbent layer further including a liquid medium within the absorbent layer, and
an impaction membrane placed on the top surface of the absorbent layer, such that the impaction membrane is in fluidic communication with the absorbent layer, wherein the impaction membrane absorbs the liquid medium.

8. The cascade impactor of claim 7, wherein the liquid medium comprises water, phosphate buffered saline, nutrient broth, lysogeny broth, skim milk, peptone water, one or more polysorbates, tryptic soy broth, glycerol, mineral oil, or combinations thereof.

9. The cascade impactor of claim 7, wherein the liquid medium is substantially free of agar.

10. The cascade impactor of claim 7, wherein the absorbent layer comprises sponge, glass, metal, ceramic, plastic, or combinations thereof.

11. The cascade impactor of claim 7, wherein the impaction membrane comprises a filter configured to absorb the liquid medium.

12. The cascade impactor of claim 7, wherein the impaction membrane comprises mixed cellulose esters, cellulose acetate, coated cellulose acetate, polytetrafluoroethylene, nylon, polycarbonate, collodion, or combinations thereof.

13. The cascade impactor of claim 7, wherein the impaction membrane has a thickness from 5 µm to 500 µm.

14. A method of collecting a biological sample with a cascade impactor, the method comprising:
introducing an aerosolized biological sample to the cascade impactor, the cascade impactor comprising an inlet, an outlet, and a vertical series of collector stages between the inlet and the outlet, and
collecting the aerosolized biological sample from any of the collector stages, wherein the cascade impactor further comprises:
a filter in fluidic communication with the outlet and wherein each collector stage comprises a collection plate, the collection plate comprising;
a container;
an absorbent layer comprising a bottom surface and a top surface, the absorbent layer residing within the container, the absorbent layer further including a liquid medium within the absorbent layer; and
an impaction membrane placed on the top surface of the absorbent layer, such that the impaction membrane is in fluidic communication with the absorbent layer, wherein the impaction membrane absorbs the liquid medium.

15. The method of claim 14, further comprising analyzing the collected biological sample via a polymerase chain reaction, an immunoassay test, a plating test, or combinations thereof.

16. The method of claim 14, wherein the liquid medium comprises water, phosphate buffered saline, nutrient broth, lysogeny broth, skim milk, peptone water, one or more polysorbates, tryptic soy broth, glycerol, mineral oil, or combinations thereof.

17. The method of claim 14, wherein the absorbent layer comprises sponge, glass, metal, ceramic, plastic, or combinations thereof.

18. The method of claim 14, wherein the impaction membrane comprises a filter configured to absorb the liquid medium.

19. The method of claim 14, wherein the impaction membrane comprises mixed cellulose esters, cellulose acetate, coated cellulose acetate, polytetrafluoroethylene, nylon, polycarbonate, collodion, or combinations thereof.

\* \* \* \* \*